(12) United States Patent
Zhang et al.

(10) Patent No.: US 12,719,128 B2
(45) Date of Patent: Aug. 25, 2026

(54) BATTERY, BATTERY MODULE, BATTERY PACK, AND ELECTRIC VEHICLE

(71) Applicant: BYD COMPANY LIMITED, Shenzhen (CN)

(72) Inventors: Zhonglin Zhang, Shenzhen (CN); Yanfei Zhou, Shenzhen (CN); Yue Zhang, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 692 days.

(21) Appl. No.: 17/791,136

(22) PCT Filed: Jan. 5, 2021

(86) PCT No.: PCT/CN2021/070319
§ 371 (c)(1),
(2) Date: Jul. 6, 2022

(87) PCT Pub. No.: WO2021/139649
PCT Pub. Date: Jul. 15, 2021

(65) Prior Publication Data

US 2023/0052047 A1 Feb. 16, 2023

(30) Foreign Application Priority Data

Jan. 10, 2020 (CN) ......................... 202020059425.0

(51) Int. Cl.
*H01M 50/258* (2021.01)
*H01M 10/04* (2006.01)
(Continued)

(52) U.S. Cl.
CPC ......... *H01M 50/258* (2021.01); *H01M 10/04* (2013.01); *H01M 50/249* (2021.01); *H01M 50/55* (2021.01); *H01M 2220/20* (2013.01)

(58) Field of Classification Search
CPC ............................ H01M 50/55; H01M 50/258
See application file for complete search history.

(56) References Cited

U.S. PATENT DOCUMENTS

2011/0129720 A1 6/2011 Yun
2012/0064387 A1* 3/2012 Kim .................... H01M 50/553 429/158
(Continued)

FOREIGN PATENT DOCUMENTS

CN 110518156 A 11/2019
CN 110518174 A 11/2019
(Continued)

OTHER PUBLICATIONS

International Search Report and Written Opinion for Application No. PCT/CN2021/070319, mailed on Apr. 8, 2021, 9 pages.
(Continued)

*Primary Examiner* — Sadie White
*Assistant Examiner* — Kayla Elaine Clary
(74) *Attorney, Agent, or Firm* — Sheppard Mullin Richter & Hampton LLP

(57) ABSTRACT

A battery, a battery module, a battery pack, and an electric vehicle are provided. The battery includes a housing; and M battery core assemblies arranged in the housing, where M is an integer, M≥2, the M battery core assemblies are stacked and are electrically connected, each of the M battery core assemblies comprises a plurality of electrode core assemblies, and the plurality of electrode core assemblies in the battery core assembly are connected in series.

13 Claims, 3 Drawing Sheets

(51) Int. Cl.
*H01M 50/249* (2021.01)
*H01M 50/55* (2021.01)

(56) References Cited

U.S. PATENT DOCUMENTS

| | | | | |
|---|---|---|---|---|
| 2013/0183559 | A1 | 7/2013 | Dhar et al. | |
| 2015/0030908 | A1* | 1/2015 | Wang | H01M 10/4207 429/158 |
| 2016/0380247 | A1* | 12/2016 | Juzkow | H01M 50/204 429/99 |

FOREIGN PATENT DOCUMENTS

| | | | |
|---|---|---|---|
| CN | 211208560 | U | 8/2020 |
| EP | 2479830 | B1 | 10/2017 |
| JP | 2004253284 | A | 9/2004 |
| JP | 2006128009 | A | 5/2006 |
| JP | 2010108733 | A | 5/2010 |
| JP | 2016046113 | A | 4/2016 |
| KR | 100784184 | B1 | 12/2007 |
| WO | 2018163816 | A1 | 1/2020 |

OTHER PUBLICATIONS

Examination Report dated May 21, 2026, issued in European Patent Application No. 21738443.7 (6 pages).

* cited by examiner

BATTERY, BATTERY MODULE, BATTERY PACK, AND ELECTRIC VEHICLE

CROSS-REFERENCE TO RELATED APPLICATIONS

This application is a national phase application of International Patent Application No. PCT/CN2021/070319, filed with the China National Intellectual Property Administration (CNIPA) on Jan. 5, 2021, which is based on and claims priority to and benefits of Chinese Patent Application No. 202020059425.0, filed on Jan. 10, 2020. The entire content of all of the above-identified applications is incorporated herein by reference.

FIELD

The present disclosure relates to the technical field of batteries, and more specifically, to a battery, a battery module, a battery pack, and an electric vehicle.

BACKGROUND

With the development of science and technology, various electronic devices, power tools, and the like are widely used. Since a battery is a core component, performance of the battery is of significance. A capacity of the battery defines an overall battery life. In the related art, an additional power connector is usually required to be arranged at a joint of two adjacent batteries connected in series for the power connection, resulting in a large number of battery mounting structures. As a result, costs increase, and an overall weight of a power battery pack increases. Moreover, the mounting structures occupy a large inner space of the battery pack, resulting in a reduction in an overall capacity of the power battery pack. In addition, since multiple external power connectors are required for power connection, an internal resistance of the battery pack increases, which increases internal consumption of the power battery pack during use, reduces a battery life of the power battery pack, and degrades user experience.

SUMMARY

The present disclosure resolves at least one of the technical problems existing in the related art. The present disclosure provides a battery. The battery has a high capacity, a high voltage, and a long battery life, reduces materials required for a housing, and brings desirable economic benefits.

The battery according to embodiments of the present disclosure includes a housing and M battery core assemblies arranged in the housing, where M≥2. The M battery core assemblies are stacked and are electrically connected, and each battery core assembly includes multiple electrode core assemblies. The multiple electrode core assemblies in each battery core assembly are connected in series.

According to the battery in the embodiments of the present disclosure, M battery core assemblies are arranged in a housing, where M≥2, so that multiple electrode cores can be arranged in the housing. By integrating the multiple electrode cores, the battery can have a high capacity or a high voltage, a battery life of the battery can be increased, materials required for the housing are reduced, and overall manufacturing process difficulty and production costs of the battery are reduced. In addition, since the multiple electrode cores are compactly arranged in the same housing, an occupied space can be reduced while increasing the battery life of the battery, thereby improving a space utilization.

According to some embodiments of the present disclosure, electrode terminals configured to lead out a current is arranged on the housing. The electrode terminals include a first electrode terminal and a second electrode terminal. The first electrode terminal and the second electrode terminal are arranged on a same side of the housing.

According to some embodiments of the present disclosure, the housing includes a body and two end covers. The two end covers are arranged on two opposite ends of the body to define an inner space of the body. The electrode terminals are arranged on one of the two end covers.

According to some embodiments of the present disclosure, M is an even number, and two adjacent battery core assemblies are connected in series.

According to some embodiments of the present disclosure, the multiple electrode core assemblies in the battery core assembly are arranged in sequence along a first direction. Each of the multiple battery core assemblies has two opposite ends along the first direction. Two adjacent battery core assemblies are connected in series by two electrode core assemblies located on a same end of the two adjacent battery core assemblies.

According to some embodiments of the present disclosure, the multiple electrode core assemblies in the battery core assembly are arranged in sequence along the first direction. Each electrode core assembly includes a first electrode lead-out member and a second electrode lead-out member configured to lead out a current. The first electrode lead-out member and the second electrode lead-out member are respectively arranged on two sides of the electrode core assembly along the first direction.

According to some embodiments of the present disclosure, two adjacent electrode core assemblies in the battery core assembly are connected in series by a first connector, and two adjacent battery core assemblies are connected in series by a second connector.

According to some embodiments of the present disclosure, at least one of the first connector or the second connector includes: a metal connector, where two ends of the metal connector are respectively connected with two adjacent electrode core assemblies; and an insulating protector, sleeved on the metal connector.

According to some embodiments of the present disclosure, the electrode core assembly includes the first electrode lead-out member and the second electrode lead-out member configured to lead out a current. The first electrode lead-out member is configured as a negative lead-out member, and the second electrode lead-out member is configured as a positive lead-out member. The metal connector includes a copper connection piece and an aluminum connection piece connected with the copper connection piece. The copper connection piece is connected with the first electrode lead-out member. The aluminum connection piece is connected with the second electrode lead-out member. The insulating protector is wrapped around a joint of the copper connection piece and the aluminum connection piece.

According to some embodiments of the present disclosure, the battery core assembly further includes multiple insulating films wrapped around the multiple electrode core assemblies in a one-to-one correspondence.

The present disclosure further provides a battery module. The battery module includes the battery described above.

The battery module according to the present disclosure includes the battery described above.

The battery module according to the embodiments of the present disclosure includes the above battery with a high capacity or a high voltage, so that not only a battery life of the battery module can be increased, but also a number of batteries in the battery module can be reduced while a battery module with the same capacity and voltage can be obtained, thereby reducing conduction members at joints of batteries. In this way, costs of the battery module are reduced, and a space occupied by the conduction members in the battery module is reduced. In addition, since the conduction members are reduced, an internal resistance of the battery module is reduced, thereby increasing the battery life of the battery module.

The present disclosure further provides a battery pack. The battery pack includes the battery or the battery module described above.

The battery pack according to the embodiments of the present disclosure includes the battery or the battery module described above.

The battery pack according to the embodiments of the present disclosure includes the battery or the battery module described above, so that not only a battery life of the battery pack can be increased, but also a number of battery modules in the battery pack can be reduced while a battery module with the same capacity and voltage can be obtained, thereby reducing power connectors at joints of battery modules. In this way, production costs of the battery pack are reduced, a production process of the battery pack is simplified, and a space occupied by the power connectors in the battery pack is reduced. In addition, since the power connectors are reduced, an internal resistance of the battery pack is reduced, so that internal consumption of the battery pack during use is reduced, thereby increasing the battery life of the battery pack.

The present disclosure further provides an electric vehicle. The electric vehicle includes the battery pack described above.

The electric vehicle according to the embodiments of the present disclosure includes the battery pack described above.

The electric vehicle according to the embodiments of the present disclosure includes the battery pack described above, so that an internal structure of the electric vehicle can be more compact, and internal consumption of the battery pack during use can be reduced, so that a battery life of the battery pack is increased, use experience of the electric vehicle is enhanced, energy is saved, and use costs are reduced, thereby enhancing user experience.

Some of the additional aspects and advantages of the present disclosure are provided in the following description, and some of them become apparent in the following description or understood through the practice of the present disclosure.

Reference Numerals

Figure 1:
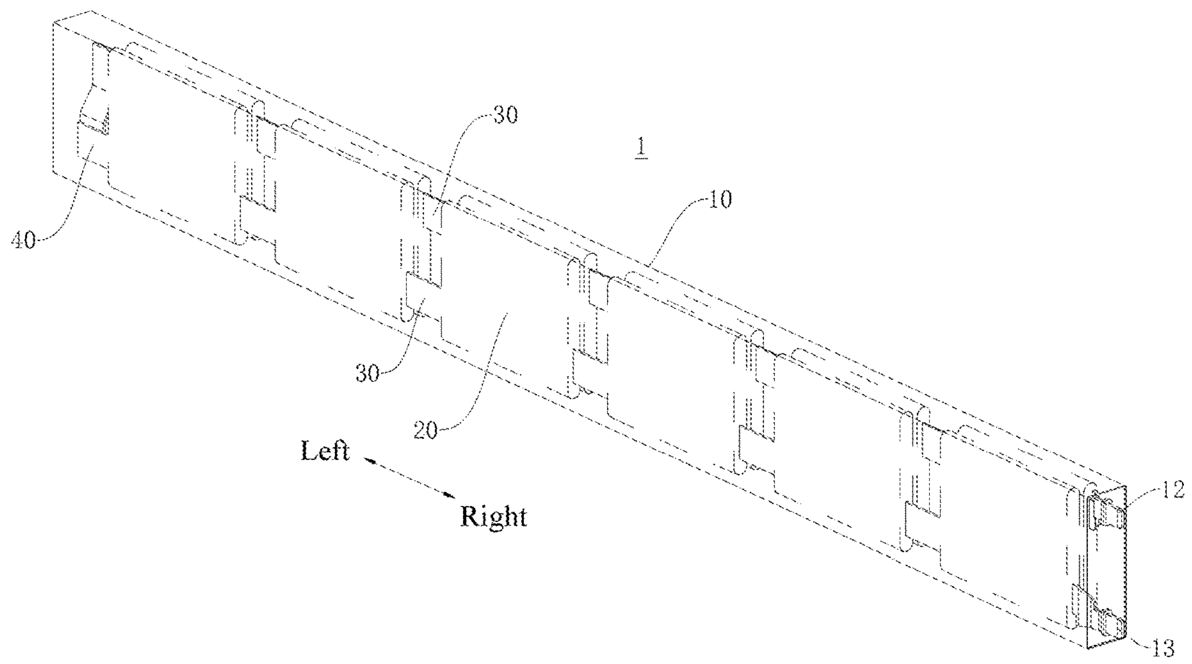
FIG. 1 is a perspective view of a battery according to an embodiment of the present disclosure.
Figure 2:
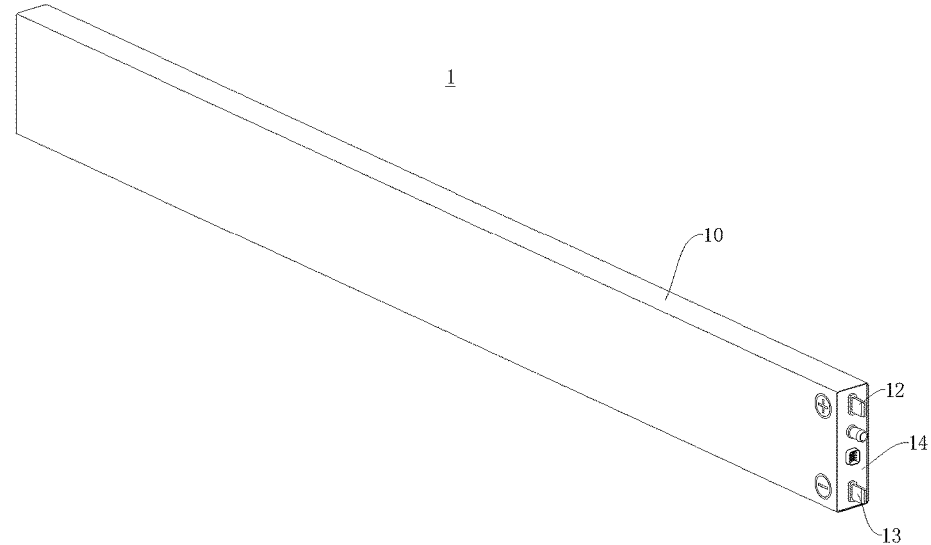
FIG. 2 is a three-dimensional view of the battery according to an embodiment of the present disclosure.

Battery 1;

Housing 10, Body 11, First electrode terminal 12, Second electrode terminal 13, First end cover 14, Second end cover 15;

Battery core assembly 20, Electrode core assembly 21, Electrode core 212; and First connector 30, Second connector 40, Metal connector a, Copper connection piece a1, Aluminum connection piece a2, Insulating protector b.

DETAILED DESCRIPTION

Embodiments of the present disclosure are described in detail below, and examples of the embodiments are shown in the accompanying drawings, where the same or similar elements or the elements having the same or similar functions are denoted by the same or similar reference numerals throughout the description. The embodiments described below with reference to the accompanying drawings are exemplary and used only for explaining the present disclosure, and are not construed as a limitation on the present disclosure.

A battery 1 according to the embodiments of the present disclosure is described below with reference to FIG. 1 to FIG. 6.

As shown in FIG. 1 to FIG. 5, according to the embodiments of the present disclosure, the battery 1 includes a housing 10 and M battery core assemblies 20. The battery 1 is configured to provide power for the operation of an electronic device, such as an electric vehicle.

Specifically, the M battery core assemblies 20 are arranged in the housing 10, and $M \geq 2$. It may be understood that, M is an integer. For example, M may be 2, 3, or 4, which is not enumerated herein. The M battery core assemblies 20 are stacked. The M battery core assemblies 20 are electrically connected. For example, two battery core assemblies 20 are stacked. For another example, three battery core assemblies 20 are stacked. Each battery core assembly 20 includes multiple electrode core assemblies 21, and each electrode core assembly 21 includes at least one electrode core 212. The multiple electrode core assemblies 21 in each battery core assembly 20 are connected in series.

It may be understood that, the stacked arrangement of the multiple battery core assemblies 20 may include that the multiple battery core assemblies 20 are connected in series, the multiple battery core assemblies 20 are connected in parallel, or the multiple battery core assemblies are partly connected in series and partly connected in parallel. This is not limited in the present disclosure. Numbers of the electrode core assemblies 21 in all of the battery core assemblies 20 may be the same, or may be different, or may be partly the same and partly different.

For example, the battery 1 includes two battery core assemblies 20. The two battery core assemblies 20 may be connected in series sequentially. The numbers of electrode core assemblies 21 in the two battery core assemblies 20 may be the same or different. In an embodiment, the battery 1 includes two battery core assemblies 20. The two battery core assemblies 20 may be connected in parallel. The numbers of electrode core assemblies 21 in the two battery core assemblies 20 may be the same or different.

For another example, the battery 1 includes three battery core assemblies 20. The three battery core assemblies 20 may be connected in series sequentially. The numbers of electrode core assemblies 21 in all of the three battery core assemblies 20 may be the same. In an embodiment, the numbers of electrode core assemblies 21 in two of the three battery core assemblies 20 may be the same, and a number of electrode core assemblies 21 in the other one of the battery core assemblies 20 may be different from the numbers of the electrode core assemblies 21 in the two of the battery core assemblies 20. In an embodiment, the battery 1 includes three battery core assemblies 20. The three battery core assemblies 20 are connected in parallel. The numbers of electrode core assemblies 21 in all of the three battery core assemblies 20 may be the same. In an embodiment, the numbers of electrode core assemblies 21 in two of the three battery core assemblies 20 may be the same, and a number of electrode core assemblies 21 in the other one of the battery core assemblies 20 may be different from the numbers of the electrode core assemblies 21 in the two of the battery core assemblies 20. In an embodiment, the battery 1 includes three battery core assemblies 20. Two of the three battery core assemblies 20 are connected in parallel and then are connected in series with the other one of the battery core assemblies 20. The numbers of electrode core assemblies 21 in all of the three battery core assemblies 20 may be the same. In an embodiment, the numbers of electrode core assemblies 21 in two of the three battery core assemblies 20 may be the same, and a number of electrode core assemblies 21 in the other one of the battery core assemblies 20 may be different from the numbers of the electrode core assemblies 21 in the two of the battery core assemblies 20.

For another example, the battery 1 includes four battery core assemblies 20. The four battery core assemblies 20 are connected in series sequentially. The numbers of electrode core assemblies 21 in all of the battery core assemblies 20 may be the same. In an embodiment, the numbers of electrode core assemblies 21 in two of the four battery core assemblies 20 may be the same, and the numbers of electrode core assemblies 21 in other two of the battery core assemblies 20 may be the same or different. In an embodiment, the numbers of electrode core assemblies 21 in three of the four battery core assemblies 20 may be the same, and a number of electrode core assemblies 21 in the other one of the battery core assemblies 20 may be different from the numbers of the electrode core assemblies in the three of the battery core assemblies. This is not enumerated in the present disclosure, and is not specifically limited. The above is merely used as an example.

It may be understood that, the numbers of the electrode core assemblies 21 in all of the multiple battery core assemblies 20 may be the same. In this way, not only arrangement regularity of the multiple battery core assemblies 20 can be improved, but also the space utilization of the housing 10 can be improved, thereby facilitating miniaturization of the battery 1. However, this is not limited in the present disclosure.

In addition, the housing 10 may be a metal housing or a housing made of a composite material. In some embodiments of the present disclosure, the housing is an aluminum housing, so that the housing 10 can be lighter, can have moderate structural strength, and can be more economical. However, this is not limited in the present disclosure.

It should be further understood that the electrode core 212 mentioned in the present disclosure is an electrode core 212 frequently used in the field of power batteries, and the electrode core 212 and the electrode core assembly 21 are components inside the housing 10 of the battery 1, and shall not be understood as the battery 1. The electrode core 212 may be formed by winding or lamination. Generally, the electrode core 212 includes at least a positive plate, a separator, a negative plate, and an electrolyte solution. The electrode core 212 is generally an assembly that is not completely sealed. Therefore, the battery 1 mentioned in the present disclosure is a cell, and shall not be simply understood as a battery module or a battery pack although the battery includes multiple electrode cores 212.

It should be noted that one electrode core assembly 21 may include one electrode core 212. In an embodiment, the electrode core assembly 21 may include at least two electrode cores 212, and the at least two electrode cores 212 are connected in parallel to form an electrode core assembly 21. In addition, one electrode core assembly 21 may include three electrode cores 212 or more electrode cores 212, which is not enumerated in the present disclosure. It can be understood from the above that, when each battery core assembly 20 includes multiple electrode core assemblies 21, the numbers of electrode cores 212 in all of the electrode core assemblies 21 may be the same, or may be different, or may be partly the same and partly different.

In addition, the series connection between the electrode core assemblies 21 in the present disclosure may be series connection between adjacent electrode core assemblies 21. A specific implementation may be that the current lead-out members on the adjacent electrode core assemblies 21 are directly connected or electrically connected by an additional conductive member. That is to say, the two adjacent electrode core assemblies 21 may be electrically connected directly or indirectly.

Specifically, according to an embodiment of the present disclosure, two battery core assemblies 20 are arranged. Each battery core assembly 20 includes six electrode core assemblies 21. The six electrode core assemblies 21 are spaced apart and connected in series in a length direction of the housing 10. Each electrode core assembly 21 includes one electrode core 212.

According to the battery 1 in the embodiments of the present disclosure, M battery core assemblies 20 are arranged in a housing 10, where $M \geq 2$, so that multiple electrode cores 212 can be arranged in the housing 10. By integrating the multiple electrode cores 212, the battery 1 can have a high capacity or a high voltage, a battery life of the battery 1 can be increased, materials required for the housing 10 are reduced, and overall manufacturing process difficulty and production costs of the battery 1 are reduced. In addition, since the multiple electrode cores 212 are compactly arranged in the same housing 10, an occupied space can be reduced while increasing the battery life of the battery 1, thereby improving a space utilization.

According to some embodiments of the present disclosure, electrode terminals configured to lead out a current are arranged on the housing 10. The electrode terminals include a first electrode terminal 12 and a second electrode terminal 13. The first electrode terminal 12 and the second electrode terminal 13 are arranged on a same side of the housing 10. The first electrode terminal 12 and the second electrode terminal 13 are connected with an external device to provide power for the operation of the external device. The first electrode terminal 12 may be a positive electrode terminal, and the second electrode terminal 13 may be a negative electrode terminal. In an embodiment, the first electrode terminal 12 may be a negative electrode terminal, and the second electrode terminal 13 may be a positive electrode terminal. Arranging the first electrode terminal 12 and the second electrode terminal 13 on the same side of the housing 10 facilitates the arrangement of conduction members between the batteries 1 in a battery module when the battery 1 is applicable to the battery module, and facilitates the arrangement of power connection members between the batteries 1 in a battery pack when the battery 1 is applicable to the battery pack.

Figure 3:
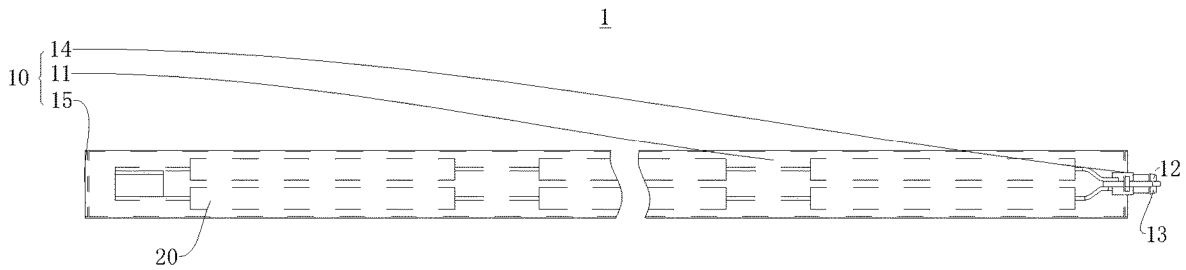
FIG. 3 is a top view of the battery according to an embodiment of the present disclosure.
Figure 4:
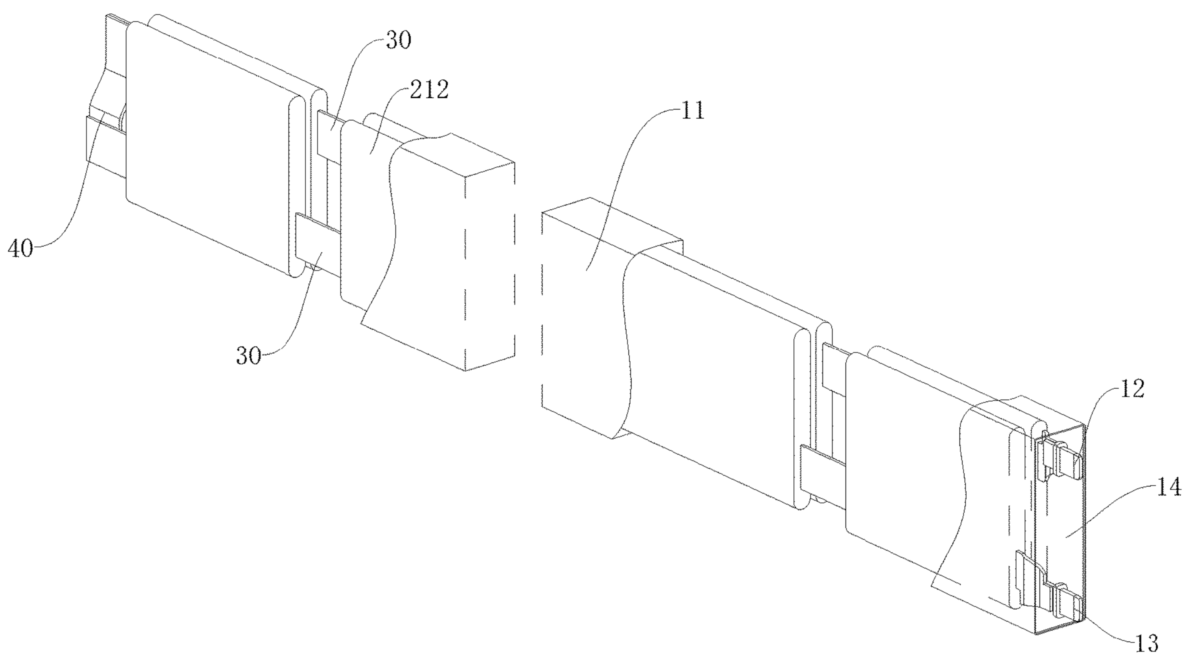
FIG. 4 is a partial cross-sectional view of the battery according to an embodiment of the present disclosure.

As shown in FIG. 3, according to some embodiments of the present disclosure, the housing 10 includes a body 11 and two end covers. The two end covers are arranged on two opposite ends of the body 11 to define an inner space of the body 11. The electrode terminal is arranged on one of the two end covers. Specifically, the two end covers are named as a first end cover 14 and a second end cover 15 respectively. The electrode terminal is arranged on the first end cover 14 or the second end cover 15. By arranging the positive electrode terminal and the negative electrode terminal on one of the end covers, costs can be reduced.

As shown in FIG. 3, the body 11 is formed as an annular shape, and two ends of the body 11 are open, so that the battery core assembly 20 can be mounted in an annular cavity formed by the body 11. The first end cover 14 is arranged on the body 11 to cover an opening on one end of the body 11, and the second end cover 15 is arranged on the body 11 to cover an opening on the other end of the body 11.

It should be noted that the first end cover 14, the second end cover 15, and the body 11 may be integrally formed, so that the assembly processes can be reduced and assembly efficiency can be improved. In addition, structural strength of the housing 10 can be enhanced, thereby ensuring connection reliability of the housing 10. In an embodiment, the first end cover 14 is integrally formed with the body 11, and the second end cover 15 is formed separately and then connected with and the body 11. In another embodiment, the first end cover 14, the second end cover 15, and the body 11 are separately formed and then connected, so that processing difficulty of the housing 10 can be reduced and production efficiency of the housing 10 can be improved.

It may be understood that, when the electrode terminal is arranged on the first end cover 14 and an odd number of battery core assemblies 20 (that is, M is an odd number) are arranged in the battery 1, two of the battery core assemblies 20 may be connected in parallel and then connected in series with the remaining battery core assemblies 20. For example, when three battery core assemblies are arranged, two of the battery core assemblies 20 may be connected in parallel and then connected in series with the other one battery core assembly 20. In an embodiment, M−1 battery core assemblies 20 may be connected in parallel and then connected in series with the other one battery core assembly 20. This is not enumerated in the present disclosure, and is not specifically limited. The above is merely used as an example.

According to some embodiments of the present disclosure, M is an even number. Each two adjacent battery core assemblies 20 are connected in series.

By arranging both of the first electrode terminal 12 and the second electrode terminal 13 on the first end cover 14 or the second end cover 15, the battery 1 can achieve a high voltage output.

According to some embodiments of the present disclosure, two adjacent battery core assemblies 20 are connected in parallel, so that the battery 1 realizes a high-capacity output.

Figure 5:
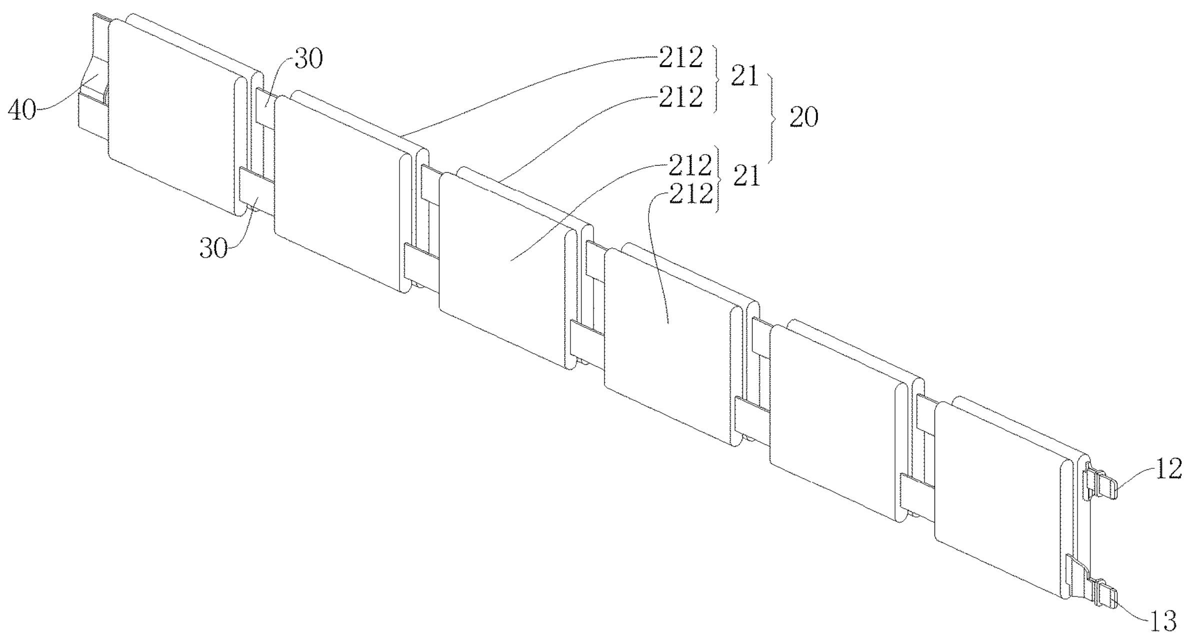
FIG. 5 is a partial three-dimensional structural view of the battery according to an embodiment of the present disclosure.

For example, as shown in FIG. 5, two electrode core assemblies 21 are arranged, and the first electrode terminal 12 and the second electrode terminal 13 are both arranged on the first end cover 14. In some embodiments of the present disclosure, the second end cover 15 is integrally formed with the body 11, and the first end cover 14 is formed separately and then connected with the body 11, so that processing steps and man-hours can be reduced, thereby reducing production costs. However, the present disclosure is not limited thereto.

Further, the multiple electrode core assemblies 21 of the battery core assembly 20 are arranged in sequence along a first direction. The first direction is a left-to-right direction shown in FIG. 1. It should be noted that the first direction is a length direction of the battery 1. Each of the multiple battery core assemblies has two opposite ends along the first direction. Two adjacent battery core assemblies 20 are connected in series by two electrode core assemblies 21 located on a same end. In this way, connection difficulty of the two adjacent battery core assemblies 20 is reduced, and a connection distance between the two adjacent battery core assemblies 20 is shortened, so that connection efficiency is relatively improved, thereby reducing the costs.

According to some embodiments of the present disclosure, the multiple electrode core assemblies 21 of the battery core assembly 20 are arranged in sequence along the first direction. The first direction is the left-to-right direction shown in FIG. 1. Each electrode core assembly 21 includes a first electrode lead-out member and a second electrode lead-out member configured to lead out a current. The first electrode lead-out member and the second electrode lead-out member are respectively arranged on two sides of the electrode core assembly 21 along the first direction. It should be noted that the first direction is the length direction of the battery 1. It should be further noted that, arranging the multiple electrode core assemblies 21 in the battery core assembly 20 in sequence along the first direction herein means arranging the multiple electrode core assemblies 21 in the same battery core assembly 20 along the first direction.

It may be understood that, each electrode core assembly 21 is required to be connected in series to connect the multiple electrode core assemblies 21 in series. By using the first electrode lead-out member and the second electrode lead-out member arranged on each electrode core assembly 21, series connection between the two adjacent electrode core assemblies 21 can be realized. Moreover, the connection difficulty is relatively low, and the connection efficiency is relatively high. It may be understood that, in some embodiments, the first electrode lead-out member and the second electrode lead-out member are respectively a positive tab and a negative tab on an electrode core, but the present disclosure is not limited thereto.

For example, when an electrode core assembly 21 includes only one electrode core 212, the first electrode lead-out member and the second electrode lead-out member may be respectively a positive tab and a negative tab of the electrode core 212. When an electrode core assembly 21 includes multiple electrode cores 212, the first electrode lead-out member may be a positive lead-out terminal formed by combining and welding positive tabs of the multiple electrode cores 212 together, and the second electrode lead-out member may be a negative lead-out terminal formed by combining and welding negative tabs of the multiple electrode cores 212 together. In an embodiment, the first electrode lead-out member may be the negative lead-out terminal formed by welding the negative tabs of the multiple electrode cores 212 together, and the second electrode lead-out member may be the positive lead-out terminal formed by combining and welding positive tabs of the multiple electrode cores 212 together.

It should be noted that “first” of the first electrode lead-out member and “second” of the second electrode lead-out member are merely used to distinguish between names, and are not used to limit a quantity.

According to some embodiments of the present disclosure, the multiple electrode core assemblies 21 of the battery core assembly 20 are arranged in sequence along the first direction. The first direction is the left-to-right direction shown in FIG. 1. The electrode core assembly 21 includes a first electrode lead-out member and a second electrode lead-out member configured to lead out a current. The first electrode lead-out member and the second electrode lead-out member are respectively arranged on the two sides of the electrode core assembly 21 along the first direction. Each of the multiple battery core assemblies 20 has a first end and a second end opposite to each other along the first direction. The first electrode terminal 12 and the second electrode terminal 13 are arranged on a same end cover, that is, are both arranged on the first end or on the second end. When M is an even number, each two adjacent battery core assemblies 20 are connected in series by two electrode core assemblies 21 located on the first end or two electrode core assemblies 21 located on the second end 22. It may be understood that, an arrangement direction of the first electrode lead-out members and the second electrode lead-out members in each battery core assembly 20 is opposite to an arrangement direction of the first electrode lead-out members and the second electrode lead-out members in an adjacent battery core assembly 20. For example, when M is 2, the arrangement direction of the first electrode lead-out members and the second electrode lead-out members in one of the battery core assemblies 20 is opposite to the arrangement direction of the first electrode lead-out members and the second electrode lead-out members in the other of the battery core assemblies 20. When M is an odd number, an arrangement direction of the first electrode lead-out members and the second electrode lead-out members in at least one of the battery core assemblies 20 is opposite to an arrangement direction of the first electrode lead-out members and the second electrode lead-out members in an adjacent battery core assembly 20. For example, when M is 3, the arrangement directions of the first electrode lead-out members and the second electrode lead-out members in two adjacent ones of the battery core assemblies 20 are the same, and are opposite to the arrangement direction of the first electrode lead-out members and the second electrode lead-out members in the other one of the battery core assemblies 20.

Further, two adjacent electrode core assemblies 21 in the battery core assembly 20 are connected in series by a first connector 30, thereby realizing series connection of the multiple electrode core assemblies 21. Two adjacent battery core assemblies 20 are connected in series by a second connector 40, thereby realizing series connection of the multiple battery core assemblies 20. The first connector 30 and the second connector 40 are both electrically conductive, and specific structures thereof are configured according to actual requirements.

Figure 6:
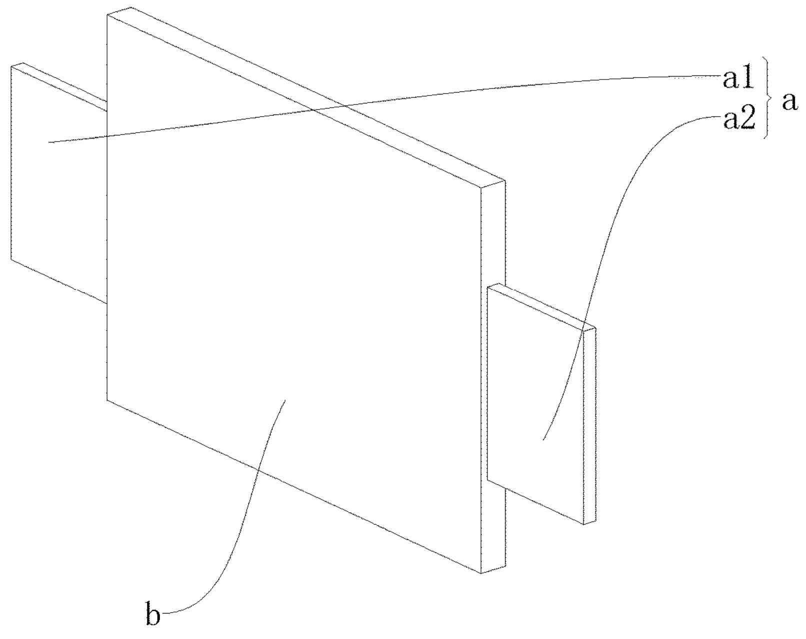
FIG. 6 is a three-dimensional view of a metal connector and an insulating protector of the battery according to an embodiment of the present disclosure.

Further, as shown in FIG. 6, the first connector 30 or the second connector 40 includes a metal connector a and an insulating protector b. Two ends of the metal connector a are respectively connected with two adjacent electrode core assemblies 21 or two adjacent battery core assemblies 20, thereby realizing series connection of the two electrode core assemblies 21 or two adjacent battery core assemblies 20. The insulating protector b is sleeved on the metal connector a, so that structural strength of the metal connector a can be improved, and safe insulation is realized, thereby reducing a possibility of electric leakage of the metal connector a.

Further, As shown in FIG. 5 and FIG. 6, the electrode core assembly 21 includes the first electrode lead-out member and the second electrode lead-out member configured to lead out a current. The first electrode lead-out member is configured as a negative lead-out member, and the second electrode lead-out member is configured as a positive lead-out member. The metal connector a includes a copper connection piece a1 and an aluminum connection piece a2. The copper connection piece a1 is connected with the first electrode lead-out member, and the aluminum connection piece a2 is connected with the second electrode lead-out member. One end of the copper connection piece a1 is connected with one end of the aluminum connection piece a2. The insulating protector b is wrapped around a joint of the copper connection piece a1 and the aluminum connection piece a2. Currently, in a commonly-used electrode core 212, a copper structural member is generally adopted as a negative lead-out terminal, because the copper structural member is set at a low potential so that lithium embedding is not readily achievable. A second electrode lead-out member is a positive lead-out terminal, and an aluminum structural member is generally adopted as the positive lead-out terminal of the commonly-used electrode core 212, because a surface of the aluminum structural member has an oxide layer which is set at a high potential so that the positive lead-out terminal is not easily oxidized. One end of the copper connection piece a1 is connected with the copper structure of one of two adjacent electrode core assemblies 21, and the other end of the aluminum connection piece a2 is connected with the aluminum structure of the other of the two adjacent electrode cores 212. Therefore, when arranging the metal connector a, a structure of the metal connector a may be configured for matching a structure of the existing electrode core 212, so that connection reliability of the metal connector a and the electrode cores 212 can be enhanced.

Further, the copper connection piece a1 and the aluminum connection piece a2 are connected by welding, thereby realizing series connection of two adjacent electrode cores 212.

Further, the insulating protector b is sleeved on the metal connector a by a plastic dipping process, a thermal shrinkage process, a spraying process, or a hot-melting process, so that a possibility that the insulating protector b falls off the metal connector a can be reduced, and a gap between the insulating protector b and the metal connector a can be reduced to a larger extent, thereby reducing a possibility of electric leakage caused by contact of the metal connector a with the housing 10 when the housing 10 is a metal housing 10.

According to some embodiments of the present disclosure, numbers of electrode cores 212 in all of the electrode core assemblies 21 are the same, so that the space utilization of the housing 10 can be improved to a larger extent.

According to some embodiments of the present disclosure, the battery core assembly 20 further includes multiple insulating films wrapped around the multiple electrode core assemblies 21 in a one-to-one correspondence. In this way, the electrode core assemblies 21 can be insulated from the housing 10, thereby reducing a possibility of a short circuit inside the battery 1. In addition, an insulating film is arranged on an outside of each electrode core assembly 21. An electrolyte solution may be filled into the insulating film, so that the electrode core assemblies 21 do not share an electrolyte solution. In this way, a possibility of a short circuit inside the battery 1 is reduced, and the electrolyte solution does not decompose as a result of a potential difference. The insulating film needs to be insulative and resistive to corrosion by the electrolyte solution. A material of the insulating film is not specially limited, as long as the insulating film does not react with the electrolyte solution. For example, the material of the insulating film may include a polypropylene (PP) film or a polyethylene (PE) film.

The battery module according to the embodiments of the present disclosure may include the battery 1 described above.

In some embodiments of the present disclosure, a communication terminal is further arranged on the housing 10. The communication terminal is electrically connected with each electrode core assembly 21. The communication terminal may be configured to detect status information (for example, a voltage and a temperature) of each electrode core assembly 21. Safety and stability are extremely vital for the battery 1. In the related art, independent batteries 1 are connected in series/parallel to form a battery module or a battery pack. Therefore, each battery 1 can be sampled outside the battery 1. However, if multiple electrode core assemblies 21 are arranged in series inside the housing 10 of the battery 1, an operating status of each electrode core assembly 21 cannot be monitored during sampling outside the battery 1. By arranging the communication terminal electrically connected to each electrode core assembly 21, each electrode core assembly 21 inside the housing 10 can be sampled to monitor the status of each electrode core assembly 21, thereby ensuring the safety and stability of the battery 1.

The battery module according to the embodiments of the present disclosure may include the above battery 1 with a high capacity or a high voltage, so that not only a battery life of the battery module can be increased, but also the number of batteries 1 in the battery module can be reduced while obtaining the same capacity and voltage, thereby reducing the conduction members at joints of batteries. In this way, costs of the battery module are reduced, and a space occupied by the conduction members in the battery module is reduced. In addition, since the conduction members are reduced, an internal resistance of the battery module is reduced, thereby increasing the battery life of the battery module.

The battery pack according to the embodiments of the present disclosure may include the battery or the battery module described above.

The battery pack according to the embodiments of the present disclosure may include the battery or the battery module described above, so that not only a battery life of the battery pack can be increased, but also the number of battery modules in the battery pack can be reduced while obtaining the same capacity and voltage, thereby reducing the power connectors at joints of battery modules. In this way, production costs of the battery pack are reduced, a production process of the battery pack is simplified, and a space occupied by the power connectors in the battery pack is reduced. In addition, since the power connectors are reduced, an internal resistance of the battery pack is reduced, so that internal consumption of the battery pack during use is reduced, thereby increasing the battery life of the battery pack.

The electric vehicle according to the embodiments of the present disclosure may include the battery pack described above.

The electric vehicle according to the embodiments of the present disclosure may include the battery pack described above, so that an internal structure of the electric vehicle can be more compact, and internal consumption of the battery pack during use can be reduced, so that a battery life of the battery pack is increased, use experience of the electric vehicle is enhanced, energy is saved, and use costs are reduced, thereby enhancing user experience.

In the description of the present disclosure, it should be understood that orientation or position relationships indicated by the terms such as "center", "longitudinal", "transverse", "length", "width", "thickness", "on", "below", "front", "back", "left", "right", "vertical", "horizontal", "top", "bottom", "inside", "outside", "clockwise", "anticlockwise", "axial direction", "radial direction", and "circumferential direction" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of the present disclosure. In addition, a feature defined to be "first" or "second" may explicitly or implicitly include one or more features. In the description of the present disclosure, unless otherwise stated, "a plurality of" means two or more than two.

In the descriptions of this specification, descriptions using reference terms "an embodiment", "some embodiments", "an exemplary embodiment", "an example", "a specific example", or "some examples" mean that specific characteristics, structures, materials, or features described with reference to the embodiment or example are included in at least one embodiment or example of the present disclosure. In this specification, schematic descriptions of the foregoing terms do not necessarily point at a same embodiment or example. In addition, the described specific features, structures, materials, or characteristics may be combined in a proper manner in any one or more of the embodiments or examples.

Although the embodiments of the present disclosure have been shown and described, persons of ordinary skill in the art should understand that various changes, modifications, replacements and variations may be made to the embodiments without departing from the principles and spirit of the present disclosure, and the scope of the present disclosure is as defined by the appended claims and their equivalents.

What is claimed is:

1. A battery, comprising:

a single housing, wherein the single housing comprises a body and two end covers arranged on two opposite ends of the body defining an inner space of the body;

a set of electrode terminals configured to lead out a current and arranged on a same end cover of the two end covers; and M battery core assemblies arranged in the single housing, wherein M is an integer, M≥2, the M battery core assemblies are stacked and are electrically connected, and each of the M battery core assemblies comprises a plurality of electrode core assemblies; and the plurality of electrode core assemblies in each of the M battery core assemblies are connected in series, wherein two adjacent electrode core assemblies in each of the M battery core assemblies are connected in series by a first connector, and wherein the first connector comprises:

a first metal connector, which comprises a copper connection piece and an aluminum connection piece electrically connected with the copper connection piece at a connection interface; and a first insulating protector, which directly surrounds the connection interface of the copper connection piece and the aluminum connection piece.

2. The battery according to claim 1, wherein M is an even number; and two adjacent battery core assemblies are connected in series.

3. The battery according to claim 2, wherein the plurality of electrode core assemblies in each of the M battery core assemblies are arranged in sequence along a first direction; each of the M battery core assemblies has two opposite ends along the first direction; and two adjacent battery core assemblies are connected in series by two electrode core assemblies located on a same end of the two adjacent battery core assemblies.

4. The battery according to claim 1, wherein the plurality of electrode core assemblies in each of the M battery core assemblies are arranged in sequence along a first direction; and each of the plurality of electrode core assemblies comprises a first electrode lead-out member and a second electrode lead-out member configured to lead out a current.

5. The battery according to claim 4, wherein the first electrode lead-out member and the second electrode lead-out member are respectively arranged on two sides of the electrode core assembly along the first direction.

6. The battery according to claim 1, wherein two adjacent battery core assemblies are connected in series by a second connector.

7. The battery according to claim 6, wherein two ends of the first metal connector are respectively connected with the two adjacent electrode core assemblies.

8. The battery according to claim 7, wherein each of the plurality of electrode core assemblies comprises a first electrode lead-out member and a second electrode lead-out member configured to lead out a current; the copper connection piece is connected with the first electrode lead-out member; and the aluminum connection piece is connected with the second electrode lead-out member.

9. The battery according to claim 6, wherein the second connector comprises:

a second metal connector, wherein two ends of the second metal connector are respectively connected with the two adjacent battery core assemblies; and a second insulating protector, sleeved on the second metal connector.

10. The battery according to claim 1, wherein each of the M battery core assemblies further comprises a plurality of insulating films wrapped around the plurality of electrode core assemblies of each of the M battery core assemblies in a one-to-one correspondence.

11. A battery pack, comprising a battery, wherein the battery comprises:

a single housing, wherein the single housing comprises a body and two end covers arranged on two opposite ends of the body defining an inner space of the body;

a set of electrode terminals configured to lead out a current and arranged on a same end cover of the two end covers; and M battery core assemblies arranged in the single housing, wherein M is an integer, M≥2, the M battery core assemblies are stacked and are electrically connected, and each of the M battery core assemblies comprises a plurality of electrode core assemblies; and the plurality of electrode core assemblies in each of the M battery core assemblies are connected in series, wherein two adjacent electrode core assemblies in each of the M battery core assemblies are connected in series by a first connector, and wherein the first connector comprises:

a first metal connector, which comprises a copper connection piece and an aluminum connection piece electrically connected with the copper connection piece at a connection interface; and a first insulating protector, which directly surrounds the connection interface of the copper connection piece and the aluminum connection piece.

12. An electric vehicle, comprising a battery pack, wherein the battery pack comprises a battery comprising:

a single housing, wherein the single housing comprises a body and two end covers arranged on two opposite ends of the body defining an inner space of the body;

a set of electrode terminals configured to lead out a current and arranged on a same end cover of the two end covers; and M battery core assemblies arranged in the single housing, wherein M is an integer, M≥2, the M battery core assemblies are stacked and are electrically connected, and each of the M battery core assemblies comprises a plurality of electrode core assemblies; and the plurality of electrode core assemblies in each of the M battery core assemblies are connected in series, wherein two adjacent electrode core assemblies in each of the M battery core assemblies are connected in series by a first connector, and wherein the first connector comprises:

a first metal connector, which comprises a copper connection piece and an aluminum connection piece electrically connected with the copper connection piece at a connection interface; and a first insulating protector, which directly surrounds the connection interface of the copper connection piece and the aluminum connection piece.

13. The battery according to claim 1, wherein the set of electrode terminals comprises a first electrode terminal and a second electrode terminal; and the first electrode terminal and the second electrode terminal are arranged on a same side of the single housing.

* * * * *